Figure 1:
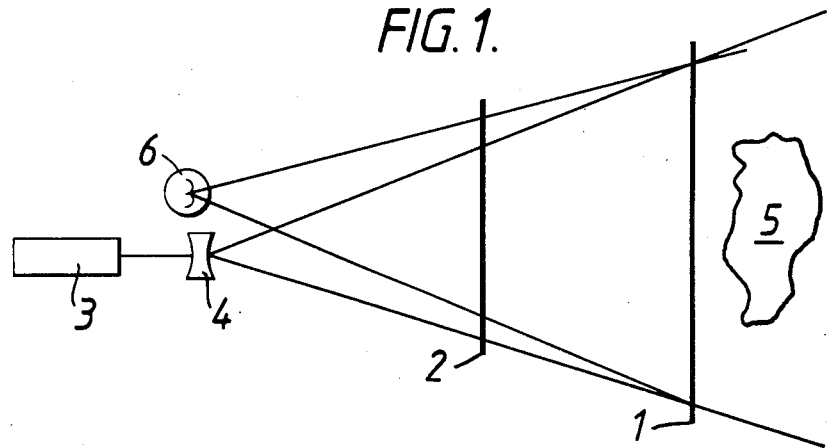

United States Patent

Holland et al.

Patent Number: 4,656,106
Date of Patent: Apr. 7, 1987

[54] METHOD OF PREPARING A MULTICOLORED HOLOGRAPHIC IMAGE

[75] Inventors: David B. Holland, Wilmslow; Glenn P. Wood, Hale, both of England

[73] Assignee: Ciba-Geigy AG, Basel, Switzerland; CHX

[21] Appl. No.: 787,353

[22] Filed: Oct. 15, 1985

[30] Foreign Application Priority Data

Oct. 26, 1984 [GB] United Kingdom ............. 8427102
Dec. 21, 1984 [GB] United Kingdom ............. 8432328

[51] Int. Cl.⁴ .................. G03C 1/04; G03C 5/00; G03C 5/04
[52] U.S. Cl. .................................. 430/2; 430/1; 430/394; 430/396
[58] Field of Search ............... 430/1, 2, 396, 394

[56] References Cited

U.S. PATENT DOCUMENTS

| | | | |
|---|---|---|---|
| 3,825,317 | 7/1974 | Inoue et al. | 430/2 |
| 3,963,490 | 6/1976 | Graube | 430/289 X |
| 4,258,111 | 3/1981 | Matsumoto et al. | 430/2 |
| 4,339,513 | 7/1982 | Alvarez et al. | 430/2 X |

FOREIGN PATENT DOCUMENTS

1009849 1/1976 Japan .
2116908 10/1983 United Kingdom .

*Primary Examiner*—John E. Kittle
*Assistant Examiner*—Mukund J. Shah
*Attorney, Agent, or Firm*—Harry Falber

[57] ABSTRACT

There is described a method of preparing a silver halide sensitized hologram having interference fringes generally parallel to the substrate which comprises effecting an imagewise photographic exposure using actinic light and effecting a holographic exposure using laser light, wherein the reference beam enters the holographic material from the opposite side to the object beam, of the holographic material, the photographic exposure and the holographic exposure being either sequential or simultaneous, developing the holographic material using a silver halide developing agent and then bleaching out the developed silver.

In the processed hologram a part of the holographic image when viewed by reflection exhibits a color relatively close to the laser light used for the holographic exposure when exposed for an appropriate time. However, in those areas where the photographic image would have been present before bleaching these areas exhibit a color of a shorter wavelength. In these areas there has been more overall exposure and thus after processing more shrinkage of the emulsion has occurred. This differential shrinkage causes the holographic image to appear multicolored.

10 Claims, 2 Drawing Figures

METHOD OF PREPARING A MULTICOLORED HOLOGRAPHIC IMAGE

This invention relates to holograms of the type used in security devices such as cheque, bank and identity cards. The holograms in security devices are preferably white light viewable. Also, they must be incapable of being copied.

One method of achieving this result is described in British Patent application No. 2,116,908. In this application a Denisyuk reflection hologram is prepared using silver halide sensitised holographic material. The hologram after exposure and development is fixed to remove the unexposed silver halide and then bleached to remove developed silver, the fixing being applied differentially to separate areas of the hologram. As described in No. 2,116,908, this differential fixing causes differential collapse of the gelatin between the original interference fringes. Thus if the hologram had been exposed using a red light laser the processed hologram when viewed in white light would exhibit a green image in the areas which have been most fixed, the colour of the image gradually changing to orange or red in the areas where least fixation has taken place. This gradual change in image colour is substantially impossible to duplicate in a copying process. The process to produce such a multicolour hologram is however rather a messy and imprecise method. We have discovered a method of producing such a multicoloured hologram in a controlled manner using primarily an optical method.

According to the present invention there is provided a method of preparing a silver halide sensitised hologram having interference fringes generally parallel to the substrate which comprises effecting an imagewise photographic exposure using actinic light and effecting a holographic exposure, using laser light wherein the reference beam enters the holographic material from the opposite side to the object beam, of the holographic material, the photographic exposure and the holographic exposure being either sequential or simultaneous, there being an overlap of the photographic exposure and the holographic exposure, developing the holographic material using a silver halide developing agent and then performing a processing step or sequence which causes a shrinkage of the silver halide binder either in those areas of the material which have been least light exposed or in those areas of the material which have been most light exposed.

An example of such a processing step is a silver bleaching step using a solvent bleach in which case there is a shrinkage in those areas of the binder in those areas of the hologram which have been light exposed due to the removal of developed silver from the binder.

Another processing step comprises the use of a rehalogenating bleach wherein after silver development the unexposed silver halide is removed. The developed silver is then reconverted to silver halide in such a way that the silver halide is then present in the exposed parts of the holographic material and does not diffuse significantly to the unexposed parts.

In this case there is a shrinkage of the binder in those areas of the binder which have been least light exposed due to the removal of the unexposed silver halide from the material.

To obtain clear holographic image differentiation when using a rehalogenating bleach a bleach must be used which causes substantially no diffusion of the silver halide which is formed from the developed silver. Suitable rehalogenating bleaches include potassium ferricyanide with potassium bromide or iodide; a ferric salt such as ferric nitrate or chloride together with potassium bromide; a non-aqueous solution of bromine or bromine vapour.

By photographic exposure is meant an imagewise exposure using actinic light such that after a normal black and white processing sequence which comprises development using a silver halide developing agent and fixing out of the unexposed silver halide an image of the object which was imagewise exposed would be visible on the material.

An example of a solvent bleach bath is an acid silver bleach for example a potassium dichromate and sulphuric acid bleach.

Any of the usual silver halide fixing agents can be used to perform the fixing step for example sodium or ammonium thiosulphate.

It is to be understood that the actinic light source used for the photographic exposure may be the same laser as used for the holographic exposure and a single exposure using such a laser may comprise both a photographic exposure and a holographic exposure. However a tungsten filament lamp or flash may be used for photographic exposure.

The holographic exposure wherein the reference beam enters the holographic material from the opposite side to the object beam may be and preferably is a Denisyuk exposure wherein the reference beam passes through the holographic material strikes the object and is reflected back to the holographic material.

Examples of suitable holographic film material for use in the present invention are films optionally red sensitised to 694 nanometers which are of use with pulsed ruby lasers, films optimally red sensitised to 633 nanometers which are of use with helium-neon lasers, film optimally sensitised to 647 nanometers which are of use with krypton lasers. Also of use are green sensitised films between 500 and 600 nanometers for use with an argon laser.

The photographic exposure may be arranged so that the exposing light enters the holographic material on the same side as the reference beam in the holographic exposure or so that it enters the holographic material from the opposite side. Usefully, the photographic exposure is an exposure through an optical pattern such as an optical mask, an optical grating, a step wedge or a photographic transparency.

The photographic and holographic exposures are such that there is an overlap of the photographic image and the holographic image. When the holographic material has been developed and further processed there is visible in the hologram a holographic image, but no photographic image in the conventional sense is visible because all the image silver has been bleached out or reconverted to silver halide. A part of the holographic image when viewed by reflection exhibits a colour relatively close to the laser light used for the holographic exposure when exposed for an appropriate time. However, when a solvent bleaching step is carried out, in those areas where the photographic image would have been present before bleaching these areas exhibit a colour of a shorter wavelength. In these areas there has been more overall exposure and thus after processing more shrinkage of the gelatin has occurred as more silver has been removed. This differential shrinkage causes the holographic image to appear multicoloured.

The variation of image colour is seen in the film plane but the holographic image can be behind, in or in front of the film plane when viewed.

On the other hand when the processing sequence after development comprises the fixing out of the undeveloped silver halide followed by a rehalogenating bleach more shrinkage of the gelatin has occurred in the least exposed areas when the unexposed silver halide has been removed. Thus in those areas of the material where the photographic image would not have been present before fixing and the rehalogenating bleach step these areas exhibit a colour of shorter wavelength because more shrinkage of the gelatin has occurred in those areas.

The accompanying drawings will serve to illustrate the invention.

The holographic film used to illustrate the invention comprised a silver halide sensitised holographic film having an average silver halide crystal size of 0.035 μm. The silver halide crystals were red sensitised to the wavelength of a pulsed ruby laser that is to say 695 n.m. The emulsion was coated on a subbed polyester base.

In FIG. 1 there is shown a holographic film 1 as just described. In front of the holographic film 1 but displaced from it is a step wedge 2. A pulsed ruby laser 3 and diverging lens 4 illuminates through the film 1 an object 5 the holographic image of which it is desired to record on the holographic film. There is also a white light tungsten filament lamp 6.

The following sequence of exposures were made using for each sequence a new holographic film 1.

Sequence 1. The wedge 2 was removed. A laser exposure of object 5 was then carried out using the laser 3. This is a Denisyuk exposure in that the laser 3 produces a reference beam which strikes the object 5 through the film 1 and a image beam is reflected back from the object 5 on to the holographic film 1.

To determine the optimum laser exposure level required a series of exposures were made on holographic films and the samples were processed as set out later herein. The exposure level required to produce a red holographic image was noted and this exposure level was used in the subsequent holographic exposures. If the exposure level is too low no holographic image is obtained. If the exposure level is too high a yellowish or green image is obtained.

Sequence 2. The wedge 2 was replaced. The film 1 was then exposed through wedge 2 using the lamp 6. A suitable light exposure level (intensity of light × length of exposure) was calculated from the known sensitivity of the film to produce in the film material the same density of developed silver after the development step as that obtained by the noted optimum laser exposure level.

Sequence 3. With the wedge still in position the film was exposed through the wedge 2 using lamp 6. The exposure level was the same as that used in Sequence 2. The wedge was then removed and a holographic exposure of object 5 was carried out using the ruby laser 3 as in sequence 1. The holographic exposure level was the same as that used in sequence 1.

Sequence 4. With the wedge replaced a simultaneous photographic exposure using lamp 6 and a holographic exposure using laser 3 was carried out.

Sequence 5. With the wedge still in position, a laser exposure approximately four times the energy of that used in sequence 1 was made of object 5.

Sequence 6. The wedge 2 was removed. A laser exposure of the object 5 was carried out. The wedge 2 was then replaced and the film 1 was exposed through the wedge 2 by lamp 6. Exposure levels were as in sequence 3.

Figure 2:
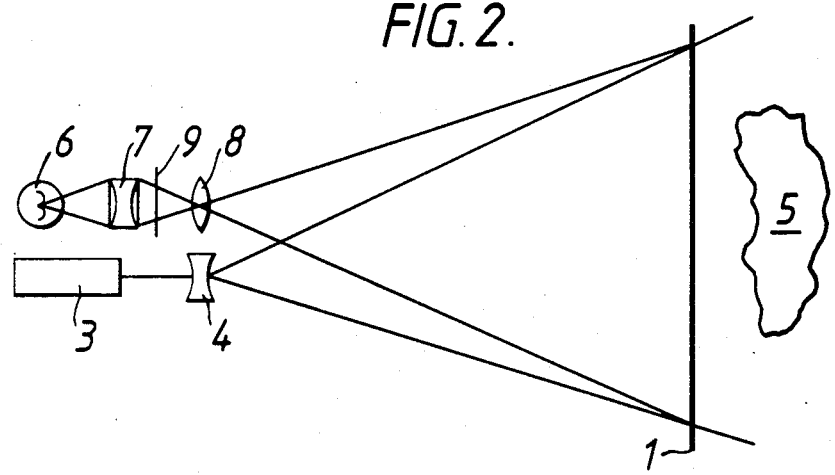

In FIG. 2 there is shown a holographic film 1 as previously described. A pulsed ruby laser 3 and diverging lens 4 illuminates through the film 1 an object 5. The film can also be illuminated by a projection apparatus consisting of tungsten-halide lamp 6, condenser lenses 7, and projection lens 8. The image of a transparency 9 can be projected onto the film 1.

Sequence 7. An image of transparency 9 was projected by apparatus 6, 7 and 8 to expose film 1. Then the film was exposed by the laser 3 to form a hologram of object 5. Exposure levels were as in sequence 3.

Sequence 8. The film 1 was exposed by the laser 3 to form a hologram of object 5. Subsequently an image of transparency 9 was projected onto the film 1 by apparatus 6, 7 and 8. Exposure levels were as in sequence 3.

All the holographic films used in sequences 1 to 8 were then developed for 1½ minutes at a temperature of 24° C. in a silver halide developing solution of the following formulation:

30 g Anhydrous Sodium Sulphite
10 g Hydroquinone
60 g Anhydrous Sodium Carbonate
Distilled Water to 1000 ml Following a 5 minute wash in running water the films were then bleached until clear (approximately 3 minutes) in a silver bleaching solution at 24° C. of the following formulation:

20 g Ammonium Dichromate
0.5 ml Concentrated Sulphuric Acid
Distilled Water to 1000 ml After a five minute wash in running water and leaving to dry, the eight films were then examined. In none of the films was there present a photographic image of the step wedge.

The holographic image obtained on the eight films was viewed by illuminating the hologram with white light having similar divergence to the original laser beam and the following was observed:

Sequence 1. A red reflection image of the object 5 was present.

Sequence 2. No holographic image was present.

Sequence 3. A multicoloured holographic image of object 5 was obtained. In the areas of the holographic image with which the lighter areas of the step wedge had overlapped the colour of the image was greeny-blue. In the areas of the holographic image with which the darkest areas of the step wedge had overlapped the colour of the image was red as in the colour of the image in sequence 1. In intermediate areas the colour of the holographic image was yellow-green.

Sequence 4. A similar result to that obtained in sequence 3 was observed. The very short photographic laser exposure of the step wedge produced an increased effort to that seen in sequence 3. There was also a shadow cast on the holographic image.

Sequence 5. A multicoloured holographic image was observed, similar to sequence 4 with some shadowing in the holographic image.

Sequence 6. A multicoloured holographic image comparable with the image obtained in sequence 3 was observed.

Sequence 7. A multicoloured holographic image similar to that obtained in sequence 3 was observed.

Sequence 8. A multicoloured holographic image similar to that obtained in sequence 3 was observed.

In a second experiment the same film as used before was subjected to the same exposure sequences but the exposed films were processed as follows:

All the holographic films used in sequences 1 to 8 in this second experiment were then developed for 1½ minutes at a temperature of 24° C. in a silver halide developing solution of the following formulation:

30 g Anhydrous Sodium Sulphite
10 g Hydroquinone
60 g Anhydrous Sodium Carbonate
Distilled Water to 1000 ml Following a 5 minute wash in running water the films were fixed for two minutes at 24° C. in a silver halide fixing agent of the following formulation:

Sodium thiosulphate 300 g
Distilled water to 1000 ml

After a 5 minute wash in running water the film were then subjected to rehalogenating step in a solution of the following formulation:

Ferric Nitrate (9H$_2$O) 30 g
Potassium bromide 6 g
Distilled water to 1000 ml

After a final five minute wash in running water the films were left to dry and were then examined. In none of the films was there present a photographic image.

In this case the optimum laser exposure was such that in the exposure of sequence 1 a green reflection image of the object 5 was obtained.

This same exposure level was used for the other laser exposures. The photographic exposure as before was derived from this optimum laser exposure.

The results were as follows:

Sequence 1. A green reflection image of object 5 was obtained.

Sequence 2. No holographic image was present.

Sequence 3. A multicoloured holographic image of object 5 was obtained. In the areas of the holographic image with which the lighter areas of the step wedge had overlapped the colour of the image was red. In the areas of the holographic image with which the darkest areas of the step wedge had overlapped the colour of the image was green. In intermediate areas the colour of the holographic image was yellow-green.

Sequence 4. A similar result to that obtained in sequence 3 was observed. The very short photographic laser exposure of the step wedge produced an increased effect to that seen in sequence 3. There was also a shadow cast on the holographic image.

Sequence 5. A multicoloured holographic image was observed, similar to sequence 4 with some shadowing in the holographic image.

Sequence 6. A multicoloured holographic image comparable with the image obtained in sequence 3 was observed.

Sequence 7. A multicoloured holographic image similar to that obtained in sequence 3 was observed.

Sequence 8. A multicoloured holographic image similar to that obtained in sequence 3 was observed.

What is claimed is:

1. A method of preparing a silver halide sensitised multicolored hologram having interference fringes generally parallel to the substrate which comprises effecting an imagewise photographic exposure using actinic light, effecting a holographic exposure using laser light wherein the reference beam enters the holographic material from the opposite side to the object beam, of the holographic material, the photographic exposure and the holographic exposure being either sequential or simultaneous, there being an overlap of the photographic exposure and the holographic exposure, developing the holographic material using a silver halide developing agent and then shrinking the silver halide binder by removal of silver content either in those areas of the material which have been most light exposed or in those areas of the material which have been least light exposed.

2. A method according to claim 1 wherein the shrinking step is a silver bleaching step using a solvent bleach.

3. A method according to claim 2 wherein the solvent bleach is an aqueous solution of potassium dichromate and sulphuric acid.

4. A method according to claim 1 wherein the the shrinking step is a silver halide fixing step, followed by a rehalogenating bleach step wherein the rehalogenated silver does not diffuse to any appreciable extent.

5. A method according to claim 4 wherein the rehalogenating bleach step uses either an aqueous solution of potassium ferricyanide with potassium bromide, or an aqueous solution of a ferric salt and potassium bromide.

6. A method according to claim 4 wherein the rehalogenating bleach step uses a non-aqueous solution of bromine or bromine vapour.

7. A method according to claim 1 wherein both the photographic exposure and the holographic exposure are made using a laser.

8. A method according to claim 1 wherein the photographic exposure is made through an optical mask.

9. A method according to claim 1 wherein the photographic exposure is carried out by projecting an image onto the material.

10. A method according to claim 1 wherein the holographic exposure is a Denisyuk exposure.

* * * * *